United States Patent
Rameil-Green

(10) Patent No.: US 9,628,938 B2
(45) Date of Patent: Apr. 18, 2017

(54) DETERMINATION OF IMS APPLICATION SERVER INSTANCE BASED ON NETWORK INFORMATION

(71) Applicant: Vodafone Holding GmbH, Düsseldorf (DE)

(72) Inventor: Marc A. Rameil-Green, Düsseldorf (DE)

(73) Assignee: Vodafone Holding GmbH, Dusseldorf (DE)

( * ) Notice: Subject to any disclaimer, the term of this patent is extended or adjusted under 35 U.S.C. 154(b) by 114 days.

(21) Appl. No.: 14/247,792

(22) Filed: Apr. 8, 2014

(65) Prior Publication Data

US 2014/0301273 A1 Oct. 9, 2014

(30) Foreign Application Priority Data

Apr. 8, 2013 (EP) .................................. 13162694

(51) Int. Cl.
| | |
|---|---|
| *H04W 8/04* | (2009.01) |
| *H04W 4/00* | (2009.01) |
| *H04W 4/20* | (2009.01) |
| *H04L 29/08* | (2006.01) |
| *H04W 88/18* | (2009.01) |
| *H04L 29/12* | (2006.01) |
| *H04W 4/16* | (2009.01) |

(52) U.S. Cl.
CPC ......... *H04W 4/001* (2013.01); *H04L 67/1002* (2013.01); *H04W 4/20* (2013.01); *H04W 8/04* (2013.01); *H04L 61/1588* (2013.01); *H04W 4/16* (2013.01); *H04W 88/182* (2013.01)

(58) Field of Classification Search
None
See application file for complete search history.

(56) References Cited

U.S. PATENT DOCUMENTS

| | | | |
|---|---|---|---|
| 7,738,900 B1 * | 6/2010 | Manroa | H04L 12/1881 455/3.01 |
| 2010/0306361 A1 | 12/2010 | Boberg et al. | |
| 2012/0005157 A1 * | 1/2012 | Forsberg | H04L 67/28 707/608 |
| 2012/0297029 A1 | 11/2012 | Gecer et al. | |
| 2015/0052422 A1 * | 2/2015 | Forsberg | G06F 3/0481 715/234 |

FOREIGN PATENT DOCUMENTS

WO 2008104225 A1 9/2008

OTHER PUBLICATIONS

European Search Report issued for corresponding European Patent Application No. 13162694.7, issued Nov. 7, 2013.

* cited by examiner

*Primary Examiner* — Michael Thier
*Assistant Examiner* — Kent Krueger
(74) *Attorney, Agent, or Firm* — Mintz Levin Cohn Ferris Glovsky and Popeo, P.C.; Peter F. Corless; Steven M. Jensen

(57) ABSTRACT

In an LTE telecommunication system subscribers may be member of a group of users wherein subscriber related data are stored on different servers according to the group of users. To enable an Aggregation/Authentication Proxy to route XCAP messages to the competent server for processing the Proxy is enabled to determine the user group membership of the subscriber by querying the Home Subscriber Server.

16 Claims, 2 Drawing Sheets

DETERMINATION OF IMS APPLICATION SERVER INSTANCE BASED ON NETWORK INFORMATION

CROSS-REFERENCE TO RELATED APPLICATION

This application is based on and claims under 35 U.S.C. §119(a) the benefit of European Application No. 13162694.7, filed on Apr. 8, 2013 in the European Patent Office, the disclosure of which is incorporated herein in its entirety by reference.

BACKGROUND (a) Field of the Invention

The disclosed invention relates to a method and a corresponding device for muting messages in a telecommunications network, particularly for muting XCAP messages received by an Aggregation/Authentication Proxy server.

(b) Description of the Related Art

In modern telecommunication systems, particularly in cellular radio communications systems according to the so-called Long Term Evolution (LIE) standard, devices are enabled to manage user specific settings. For LIE the so-called XML Configuration Access Protocol (XCAP) has been specified for managing, i.e. modifying or querying, supplementary service settings of basic services. XCAP provides a plurality of applications that are identified by application unique IDs, i.e. AUIDs. When a user wants to query or modify these supplementary service settings an XCAP request is transmitted via the user's UE to the telecommunications network, wherein the XCAP request is routed to a server that processes the XCAP request. However, the request has to be communicated to the processing server that stores the data associated with the user.

Consequently the proxy server, which has to route the XCAP request to the processing server, must have information to which of a plurality of processing servers the XCAP request must be routed. As mentioned above XCAP requests can be differentiated by their AUID, which allows a differentiation according to their function.

In case the muting of an XCAP request depends on a the user group wherein correlated data are stored at different servers, the muting does not only depend on the AUID as provided in the XCAP request but may also depend on the user group, i.e. another criteria, not provided in the XCAP request. Hence there is a problem when muting XCAP requests of a first group of customers and of a second group of customers, wherein the data to be queried or modified are stored at different servers according to their customer group.

Hence there is a need for providing information at the muting server for determining to which application server an XCAP request must be muted, wherein said determination takes the user group into account.

SUMMARY

A method for routing XCAP requests of a first group of users and XCAP requests of a second group of users at an Aggregation/Authentication Proxy server in a telecommunication system, can include steps of receiving by the Aggregation/Authentication Proxy server an XCAP request via the Ut interface transmitted by a User Equipment, UE, and transmitting a User Data Request message, UDR, by the Aggregation/Authentication Proxy server via an Sh interface to a Home Subscriber Server, and receiving a User Data Answer message, UDA, by the Aggregation/Authentication Proxy server from the Home Subscriber Server in response to the transmitted UDR message, and routing the XCAP request by the Aggregation/Authentication Proxy server based on the information comprised in the UDA message.

A telecommunication system for routing XCAP requests of a first group of users and XCAP requests of a second group of users, can include: a Telephony Application Server, and a Home Subscriber Server providing an Sh interface, and an Aggregation/Authentication Proxy server configured for receiving XCAP requests via a Ut interface from a User Equipment, UE, where the Aggregation/Authentication Proxy server is configured to transmit a User Data Request message, UDR, via the Sh interface to the Home Subscriber server and to receive a User Data Answer message, UDA, from said server in response to the transmitted UDR message, and where the Aggregation/Authentication Server is further configured for routing said XCAP request based on the information comprised in the UDA message.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Figure 1:
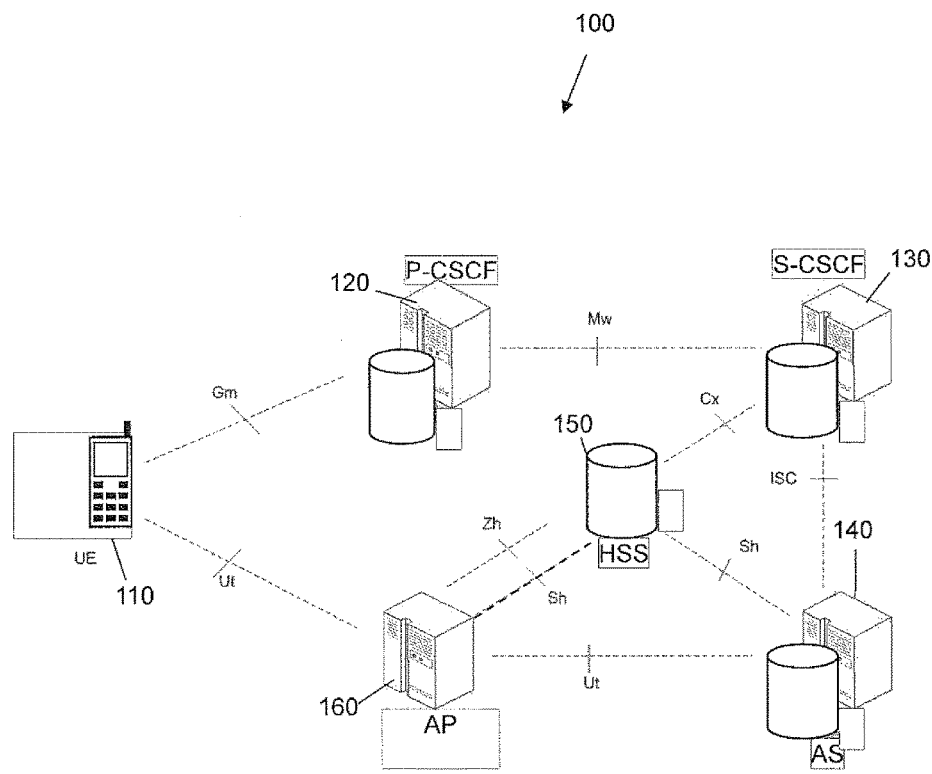
FIG. 1 depicts a mobile telecommunication system for routing an XCAP request.

FIG. 1 depicts a mobile telecommunication system 100 in which embodiments of the invention may operate. Note that in the following the terms and phrases used to a large extent are those as known from the 3GPP and particularly from the 3GPP LTE E standard documents.

The depicted telecommunication system comprises a plurality of communication devices 110, i.e. so-called User Equipments UEs that are capable of establishing a connection to the system. Note that a UE can be a mobile phone including so-called smart-phones or tablet computers or any other device capable of coupling to telecommunication system, and in particular capable of transmitting a message according to the XCAP protocol to the system.

In one embodiment the UEs are configured to couple to the telecommunications system via a radio connection according to a 3G or 4G radio specification. In one embodiment a UE 110 may couple to the network and exchange messages via the Gm reference point as described in 3GPP TS23.228, wherein the used protocol is SIP, i.e. the Session Initiation Protocol as described in IETF RFC 3261. The UE couples via the Gm reference point to a Proxy Call Session Control Function 120, P-CSCF, which for the UE is the entry point to the IP Multimedia Subsystem domain. For attaching to the P-CSCF the UE performs the P-CSCF discovery procedures as defined. Once the UE is attached to the P-CSCF, the UE may initiate IP Multimedia Services, IMS, registrations and sessions. Once the UE is attached to the P-CSCF it may invoke services over the Gm interface, for example such as voice connections or messaging.

The P-CSCF in turn is coupled to a Serving Call Session Control Function S-CSCF by a Mw reference point, wherein the Mw reference point is used to exchange messages between Call Session Control Functions CSCFs and the protocol again is SIP. The serving CSCF in turn may couple to an Application Server, AS, via a so-called IP Multimedia Subsystem Control Interface, i.e. ISC, reference point. Here the Application Server is the serving platform that offers value added IMS services; i.e. IP Multimedia Subsystem services, and that may host and execute services requested by the UE. Serving CSCF 130 typically is coupled to a Home Subscriber Server via a Cx reference point.

The S-CSCF furthermore is coupled to a Home Subscriber Server 150, HSS, via a Cx reference point. The HSS is the entity containing subscription-related information, i.e. particular subscriber information, to support the network entities that actually handle calls or sessions. The HSS stores and provides user, i.e. subscriber, related information such as user identification, numbering and addressing information, user security information such as network access control information for authentication and authorization, user location information at inter-system level i.e. the HSS supports user registration and stores intersystem location information and furthermore stores user profile information. Accordingly the HSS provides support to the call control servers in order to complete the routing/roaming procedures by solving authentication, authorisation, Filter Criteria, location dependencies etc. The S-CSCF in this way can access subscriber information stored in the HSS as required for processing a connection initiated via the Gm interface between UE 110 and P-CSCF 120.

Note that the above described connection of UE 110 to P-CSCF 120 via the Gm reference point is one example of a connection between the UE and the network.

In order to manage, i.e. to modify or query, supplementary service settings the UE transmits a corresponding request message to the network. Requests of this kind typically are messages according to the XCAP protocol and sent from UE 110 via a Ut reference point to an Aggregation/Authentication Proxy 160, AP. Once the Aggregation/Authentication Proxy has received the XCAP message, it must forward, i.e. mute, the XCAP message to the appropriate XCAP server for processing, wherein the appropriate server in one embodiment is the one that stores the data to modify or query.

The subscriber data to be modified may be stored on different servers wherein data of different groups of subscribers may be stored on different servers. In one embodiment subscriber data of a first group of subscribes, for example subscribers of group 'consumer', may be stored by a first server whereas subscriber data of a second group of subscribers, for example subscribers of group 'enterprise' may be stored on another, different server. The server storing subscriber data of the first subscriber group may have no knowledge about subscriber data of the second group. Consequently, if an XCAP message related to a group member of the second group is routed to the XCAP server storing information only about the first group of subscribers, that server cannot process the XCAP message successfully and will return an error message.

In consideration of different servers storing the data to modify the problem arises how to determine the appropriate XCAP server for a particular user group, i.e. the server that stores the data addressed in the XCAP message.

To retrieve the information required for routing the XCAP message to the appropriate XCAP server, the Aggregation/Authentication Proxy sends a User Data Request UDR message via an Sh reference point to Home Subscriber Server 150, HSS. Server 150 processes the User Data Request message and returns a corresponding User Data Answer message, UDA, to Aggregation/Authentication Proxy 160 via the Sh reference point. Note that the current specifications do not provide for a Sh reference point between an Aggregation/Authentication Proxy and a Home Subscriber Server, but only the Zh reference point is used for authentication only.

The User Data Answer message transmitted by HSS 150 is received by the Aggregation/Authentication Proxy server and comprises information that enables the Aggregation/Authentication Proxy to mute the received XCAP request to the appropriate XCAP server, i.e. the Aggregation/Authentication Proxy routes the XCAP request based on information comprised in the UDA message. In this way, i.e. by transmitting a User Data Request via the Sh reference point to HSS 150 and receiving a corresponding User Data Answer message comprising the requested information, the Aggregation/Authentication Proxy retrieves the information required for determining the appropriate XCAP server and routing the XCAP message to said XCAP server.

Figure 2:
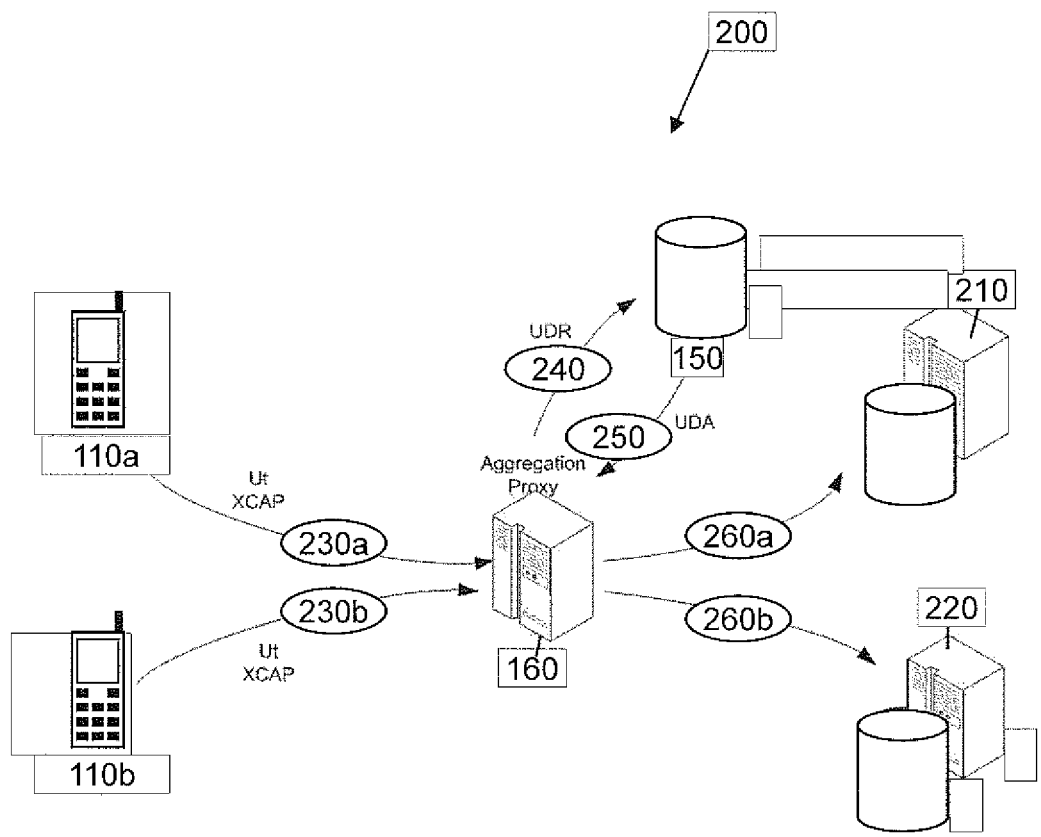
FIG. 2 depicts a message flow between entities of the telecommunication system when routing an XCAP request.

FIG. 2 depicts the message flow in a telecommunications system 200 from a mobile device to the Aggregation/Authentication Proxy and the flow of messages between the servers within the network. Note that the reference numerals of the involved devices as far as possible are those as introduced in FIG. 1.

User equipments 110*a* and 110*b* can be arbitrary devices. Without limiting the invention user equipment 110*a* and 110*b* are mobile devices according to the LTE standard, i.e. the devices are capable of transmitting messages according to the XCAP protocol to an Aggregation/Authentication Proxy 160. UEs 110*a* and 110*b* may be of identical or differing hard- and software.

UEs 110*a* and 110*b* differ in that they are members of different user groups wherein these user groups are distinguished in the core network of the telecommunication system and wherein the core network may store data related to the subscribers, i.e. users, on different servers depending on the user group of the subscriber. In the here described embodiment User Equipment 110*a* is an LTE device that is member of a first user group, e.g. a so-called consumer and User equipment 110*b* is an LTE device that is member of a second user group, e.g. so-called enterprise user group.

Data related to a subscriber of the first user group that may be modified by the subscriber himself via messages according to the XCAP protocol may be stored on a first user group server that is different from a second user group server. The first user group server in the here described embodiment can be a Telephony Application Server 210, TAS, which stores data related to supplementary services of user group consumer. These data can be modified by the subscriber by transmitting requests according to the XCAP protocol. Data related to a subscriber of the second user group that may be modified by subscriber may be stored on a second user group server. The second user group server may be a so-called New Generation Intelligent Network 220, NGIN, which stores data related to supplementary services of user group enterprise.

As described in the following the proxy 160 routes an incoming XCAP message to the appropriate XCAP Server, which in this embodiment may be the Telephony Application Server 210, or the NGIN 220.

In a first step and as illustrated in FIG. 2 by 230*a* Aggregation/Authentication Proxy 160 receives an incoming authenticated XCAP request message from consumer device 110*a*. Upon receipt of the XCAP message, Aggregation/Authentication Proxy 160 sends a User Data Request Message 240, to Home Subscriber Server 150, wherein that User Data request is transmitted via an Sh reference point as defined in 3GPP TS29.328. In particular the User Data Request is sent by a so-called Diameter client to a Diameter Server as described in 3GPP TS29.329. Note that the Sh method as standardized already includes the Diameter mechanisms, i.e. Attribute Value Pairs AVPs, to retrieve data, i.e. the Filter Criteria, from the HSS. Hence User data information can be queried by sending a User Data Request message, which includes a specific request for Filter Criteria information (enumerated value 13).

The UDR message 240 comprises data uniquely identifying the subscriber, which in one embodiment can be the MSISDN. Furthermore the requested data of interest is specified in the UDR message 240 in order to instruct the HSS 150 what information to return. In one embodiment the UDR may instruct the Home subscriber Server 150 to return the Filter Criteria, of which one of the information elements is the 'Application Server Name' used for IMS service invocation, which is used in combination with other information elements, i.e. User Identity and Data Reference, as key to filter criteria. The attribute value pair (AVP) Data-Reference indicates the type of the requested user data in the UDR command as specified in 3GPP TS 29.328. In particular the value of 'InitialFilterCriteria' may be requested.

The Home Subscriber Server 150 processes the received UDR message and accordingly returns a User Data Answer message 250, UDA, to the requesting Aggregation/Authentication Proxy 160. Said UDA message comprises the filter criteria from the generic AVP User-Data. The format of the UDA message in one embodiment may be the following, wherein the Command-Code field is set to 306 and the 'R' bit is cleared in the command flags field:

```
<User-Data-Answer>::-=<Diameter Header: 306, PXY, 16777217>
<Session-ID>
    {Vendor-Specific-Application-ID}
    [Result-Code]
    [Experimental-
    Result] {Auth-
    Session-State}
    {Origin-Host}
    {Origin-Realm}
    [Wildcarded Public Identity]
    [Wildcarded IMPU] [User-Data]
```

Aggregation/Authentication Proxy 160 receives the UDA message from the Home Subscriber Server 150 via the Sh reference point. Then Proxy 160 parses the UDA message to extract the returned filter criteria in the [User-Data] AVP, wherein the parsing mechanism can he based on regular expression mechanisms, as to not be restricted to a simple exact match algorithm. The parsing of the filter criteria indicates whether the subscriber, which sent the XCAP message, is a member of the first group of users, i.e. a member of user group consumer, or of the second group of user, i.e. a member of user group enterprise. The decision of Proxy 160 where to route the XCAP message for appropriate processing is then based on the membership of the subscriber. In case the parsing of the UDA message indicates that the requesting subscriber is a member of the first group of users, Aggregation/Authentication Proxy 160 routes the XCAP message 230a as received from device 110a to the XCAP server competent for processing XCAP messages of members of the first group of users, i.e. the XCAP server storing the data for the supplementary services of the first group of users, i.e. the server competent for processing XCAP messages of consumer users. In the here described embodiment, i.e. the XCAP request message originates from consumer device 110a, Proxy 160 routes the XCAP message to Telephony Application Server 210 as indicated by reference numeral 260a.

If the request message sent in the first step originates from device 110b, i.e. a device of user group enterprise, then Aggregation/Authentication Proxy 160 receives that XCAP message 230b. Similarly as described above Aggregation/Authentication Proxy 160 sends a User Data Request message 240 via the Sh reference point to Home Subscriber Server 150, wherein this time the UDR message 240 is related to the XCAP message originating from device 110b. Server 150 receives and processes UDR message 240 and returns a User Data Answer message 250 via the Sh reference point to Proxy 150. Upon receipt of UDA message 250 Proxy 160 parses the UDA message, i.e. parses out the Application Server from the returned filter criteria in the [User-Data] AVP to determine whether the XCAP message sender is a member of the first or second user group. In this case Proxy 160 will determine that the sender of XCAP message 250b is member of the second user group, i.e. is member of user group enterprise. As described above the decision at the Aggregation/Authentication Proxy 160 where to route XCAP message 230b is based on the determined membership of the XCAP message sender. Consequently Proxy 160 in this case mutes the XCAP message to NGIN 220, confer 260b, for further processing of XCAP message 230b.

In this way, i.e. by providing an Sh reference point between Aggregation/Authentication Proxy 160 and Home Subscriber Server 150 and by requesting the required application server instance by transmitting a User Data Request message and receiving a corresponding User Data Response message, the Aggregation/Authentication Proxy 160 is enabled to retrieve the information needed for appropriate routing of an incoming XCAP message.

Note that in the described embodiment it is assumed that the Application Server address to identify an enterprise subscriber is configurable by an operator and furthermore allows identifying a physical Application Server instance in case of multiple physical nodes.

The invention claimed is:

1. A method for routing XML Configuration Access Protocol (XCAP) requests of a first group of users and XCAP requests of a second group of users at an Aggregation/Authentication Proxy server in a telecommunication system, comprising:
   receiving by the Aggregation/Authentication Proxy server an XCAP request via a Ut interface transmitted by a User Equipment (UE),
   transmitting a User Data Request (UDR) message by the Aggregation/Authentication Proxy server via an Sh interface to a Home Subscriber Server (HSS),
   processing the UDR message and returning, by the HSS, a User Data Answer (UDA) message to the Aggregation/Authentication Proxy server only via the Sh interface in response to the transmitted UDR message,
   receiving the UDA message by the Aggregation/Authentication Proxy server from the Home Subscriber Server, and
   routing the XCAP request by the Aggregation/Authentication Proxy server based on information contained in the UDA message.

2. The method of claim 1 wherein the UDA message comprises identification information of the first or second group of users.

3. The method of claim 1 wherein the UDA message comprises filter criteria identifying the first or second group of users.

4. The method of claim 1 wherein the Aggregation/Authentication Proxy server routes the XCAP request to an XCAP Server.

5. The method of claim 4 wherein the XCAP Server is a Telephony Application Server (TAS), or a Next Generation Intelligent Network (NGIN).

6. The method of claim 1 wherein the XCAP request comprises at least one of a query or set command.

7. The method of claim 6 wherein said query or set command is for supplementary service settings bound to the first or second group of users.

8. The method of claim 1 wherein the first and second group of users having different filter criteria stored in a Home Subscriber Server (HSS).

9. A telecommunication system for routing XML Configuration Access Protocol (XCAP) requests of a first group of users and XCAP requests of a second group of users, comprising:
   a Telephony Application Server;
   a Home Subscriber Server providing an Sh interface; and
   an Aggregation/Authentication Proxy server configured for receiving XCAP requests via a Ut interface from a User Equipment (UE),
   wherein the Aggregation/Authentication Proxy server is configured to transmit a User Data Request (UDR) message via the Sh interface to the Home Subscriber Server (HSS),
   wherein the HSS processes the UDR message and returns a User Data Answer (UDA) message to the Aggregation/Authentication Proxy server only via the Sh interface in response to the transmitted UDR message,
   wherein the Aggregation/Authentication Proxy server receives the UDA message from the HSS, and
   wherein the Aggregation/Authentication Proxy server is further configured for routing said XCAP request based on information contained in the UDA message.

10. The telecommunication system of claim 9 wherein the UDA message comprises identification information of the first or second group of users.

11. The telecommunication system of claim 9 wherein the UDA message comprises filter criteria identifying the first or second group of users.

12. The telecommunication system of claim 9 wherein the Aggregation/Authentication Proxy server is configured for routing the XCAP request to an XCAP server.

13. The telecommunication system of claim 12 wherein the XCAP server is a Telephony Application Server (TAS), or a Next Generation Intelligent Network (NGIN).

14. The telecommunication system of claim 9 wherein the XCAP request comprises at least one of a query or set command.

15. The telecommunication system of claim 9 wherein said XCAP request is for supplementary service settings bound to the first or second group of users.

16. The telecommunication system of claim 9 wherein the first and second group of users having different filter criteria stored in a Home Subscriber Server (I-ISS).

* * * * *